United States Patent
Ohnishi

(10) Patent No.: US 11,148,170 B2
(45) Date of Patent: Oct. 19, 2021

(54) ULTRASONIC VIBRATION APPLICATION TOOL AND ULTRASONIC PROCESSING DEVICE

(71) Applicant: UWAVE CO., LTD., Nagaoka (JP)

(72) Inventor: Kazumasa Ohnishi, Nagaoka (JP)

(73) Assignee: UWAVE CO., LTD., Niigata (JP)

( * ) Notice: Subject to any disclaimer, the term of this patent is extended or adjusted under 35 U.S.C. 154(b) by 325 days.

(21) Appl. No.: 16/321,310

(22) PCT Filed: Feb. 9, 2018

(86) PCT No.: PCT/JP2018/004728
§ 371 (c)(1),
(2) Date: Jan. 28, 2019

(87) PCT Pub. No.: WO2018/147445
PCT Pub. Date: Aug. 16, 2018

(65) Prior Publication Data
US 2019/0351452 A1    Nov. 21, 2019

(30) Foreign Application Priority Data

Feb. 10, 2017 (JP) ................................. 2017-037519
Mar. 2, 2017 (JP) ................................. 2017-055050
May 8, 2017 (JP) ............................. JP2017-103118

(51) Int. Cl.
| | |
|---|---|
| *B06B 1/06* | (2006.01) |
| *B23B 1/00* | (2006.01) |
| *B23B 37/00* | (2006.01) |
| *B24B 1/04* | (2006.01) |
| *H02N 2/10* | (2006.01) |

(52) U.S. Cl.
CPC .......... *B06B 1/0655* (2013.01); *B06B 1/0607* (2013.01); *B23B 1/00* (2013.01); *B23B 37/00* (2013.01); *B24B 1/04* (2013.01); *H02N 2/106* (2013.01)

(58) Field of Classification Search
CPC ...... B06B 1/0655; B06B 1/0607; H02N 2/106
USPC ....................................................... 310/325
See application file for complete search history.

(56) References Cited

U.S. PATENT DOCUMENTS

2002/0010486 A1* 1/2002 Hirt .................. A61B 17/22012
606/169

* cited by examiner

*Primary Examiner* — Derek J Rosenau
(74) *Attorney, Agent, or Firm* — Nixon Peabody LLP; Jeffrey L. Costellia

(57) ABSTRACT

An ultrasonic vibration application tool equipped with a Langevin type ultrasonic vibrator which is suitably employable for ultrasonic processing devices and which efficiently generates ultrasonic vibration includes: a cylindrical housing having a contact face on a lower or bottom part of an inner surface thereof, and a lower screw part of an outer surface thereof; a bolted Langevin type ultrasonic vibrator comprising a front mass, a rear mass and a polarized piezoelectric element arranged between both masses, in which the front mass comprises a cylindrical tool-holder and a disc-shaped bulging part provided with a contact face for fitting to the contact face of the housing; and a ring-shaped counterweight having an upper screw part on an inner peripheral surface which is screwed with the screw part of the housing.

8 Claims, 11 Drawing Sheets

(A)

(B)

(A)

(B)

ULTRASONIC VIBRATION APPLICATION TOOL AND ULTRASONIC PROCESSING DEVICE

FIELD OF THE INVENTION

The present invention relates to an ultrasonic vibration application tool (or, ultrasonic oscillation application tool) and an ultrasonic processing device. The invention particularly relates to a novel ultrasonic vibration application tool using a Langevin-type ultrasonic vibrator and an ultrasonic processing device equipped with the ultrasonic vibration application tool.

BACKGROUND OF THE INVENTION

A variety of ultrasonic vibrators (or ultrasonic oscillator) utilizing a piezoelectric element as an ultrasonic vibration-generating source are known. A representative one is a Langevin-type ultrasonic vibrator comprising a pair of metal blocks and a polarized piezoelectric element fixed between these metal blocks. Particularly, a bolted Langevin-type ultrasonic vibrator comprising a polarized piezoelectric element which is fixed between a pair of metal blocks at high pressure by means of a bolt has been studied and practiced for utilization in ultrasonic processing procedures for processing various materials, for example, cutting, plastic forming, and abrasive machining, because the bolted Langevin-type ultrasonic vibrator can generate an ultrasonic vibration of high energy.

In addition, various ultrasonic vibrators are further studied and practiced for the use in various ultrasonic processing procedures utilizing diaphragm or other vibrating means, for instance, ultrasonic cleaning, metal bonding, plastic welding, ultrasonic atomizing, emulsifying and dispersing, and further for the use in ultrasonic vibration transmitting devices such as sonar (e.g. fish finder), ultrasonic inspector, ultrasonic echo-testing device for medical use, and flow meter.

Structures of variety of ultrasonic vibrators including the bolted Langevin-type ultrasonic vibrator are already known. For the sake of convenience, a structure of a representative bolted Langevin-type ultrasonic vibrator utilized practically is briefly described referring to the attached FIGS. 1 and 2.

FIG. 1 illustrates a representative structure of the bolted Langevin-type ultrasonic vibrator, in which (A) shows a top view and (B) shows a sectional view sectioned along the A-A line of (A).

In FIG. 1, the bolted Langevin-type ultrasonic vibrator 1 comprises a pair of metal blocks 2, 3 (which are practically called "front mass" and "rear mass", respectively) and a polarized piezoelectric element (e.g., piezoelectric ceramic plate such as PZT plate) 5a, 5b, 5c, 5d. The polarized piezoelectric element is fixed between the metal blocks 2, 3, by means of a combination of a bolt 6 and a nut 9. In FIG. 1, the arrows placed on the piezoelectric elements mean directions of polarization. On the piezoelectric elements are placed electrode plates (such as phosphor bronze plates) 7a, 7b, 7c, 7d, for applying electric energy to the piezoelectric elements. The Langevin-type ultrasonic vibrator 1 is equipped with a flange 8 for holding the vibrator within a holding apparatus (not illustrated).

FIG. 2 shows a structure of an ultrasonic grinding machine utilizing a bolted Langevin-type ultrasonic vibrator as an ultrasonic vibration-supplying source. In FIG. 2, the ultrasonic grinding machine 10 comprises a housing 11 and an ultrasonic vibrator 1 holding a grinder 13 at its lower end via a horn 12 and is held in the housing 11. The ultrasonic vibrator 1 is supported by bearings 14 and can rotate. The rotation of the ultrasonic vibrator 1 is actuated by an alternating current spindle motor 16. The grinding machine of FIG. 2 is supplied with an electric energy for the ultrasonic vibration of the ultrasonic vibrator from a contact-type power feeder 18 connected to an electric energy-supplying source 17 placed outside. The power feeder 18 comprises a carbon blush and a slip ring.

In the ultrasonic processing device, the ultrasonic vibration is applied to the tool held by the ultrasonic vibrator, with high efficiency, for expecting to save the electric energy for generating the ultrasonic vibration and for actuating the tool and for enhancing the processing accuracy. However, most of currently available ultrasonic processing devices cannot fulfill these expectations satisfactorily. Therefore, it cannot be said that the ultrasonic processing devices are well accepted in industry at present.

For the above-mentioned reason, it appears necessary to improve the ultrasonic processing devices so as to transmit the ultrasonic vibration generated in the ultrasonic vibrator to the equipped tool with increased efficiency.

Recently, the inventor of the present invention has continued the study for improving the ultrasonic processing device so as to transmit the ultrasonic vibration generated in the ultrasonic vibrator of the ultrasonic processing device to the tool attached to the ultrasonic vibrator. One of the recent improvements is disclosed in WO 2014/017460 A1.

WO 2014/017460 A1 discloses a structure supporting an ultrasonic oscillatory combination comprising an ultrasonic oscillator (i.e., ultrasonic vibrator) and a tool in highly stable state and keeping at a high level the ultrasonic oscillation generated in the ultrasonic oscillator from escaping to the supporting structure, whereby the ultrasonic oscillation of the ultrasonic oscillator can be transmitted to the tool with high efficiency. The supporting structure comprises a thin flange attached to the ultrasonic oscillatory combination, and the ultrasonic oscillatory combination is supported by an supporting surface of an independently placed fixture by way of bringing one side surface of the flange into contact with the fixture under stress, under the condition that the flange is not connected to the supporting surface and vibrates in its thickness direction while vibration of the ultrasonic oscillatory combination is continued.

SUMMARY OF THE INVENTION

It is observed that the ultrasonic processing device disclosed in WO 2014/017460 A1 utilizing the new supporting structure for an ultrasonic vibrator dissolves some of the problems occurring in the use of the conventionally employed ultrasonic processing devices. However, the inventor has noted that there still arise problems in the ultrasonic processing device utilizing the ultrasonic vibrator-supporting structure disclosed in WO 2014/017460 A1. The problems are those such as fatigue of the thin flange and loosing of the supporting structure between the flange and the fixture, because the ultrasonic vibrator in the ultrasonic processing device is supported by way of the thin flange.

Therefore, it is an object of the invention to provide an ultrasonic vibration application tool equipped with Langevin-type ultrasonic vibrator which is favorably installed in ultrasonic processing devices, in which the ultrasonic vibration generated in the Langevin-type ultrasonic vibrator can be applied to a processing tool attached to the ultrasonic vibration application tool with increased efficiency.

The present inventor has continued the study on the loss of ultrasonic vibration energy generated in the Langevin-type ultrasonic vibrator. As a result, he has found that the below-described ultrasonic vibration application tool (i.e., ultrasonic vibration applicator) of the invention can solve the above-mentioned problems satisfactorily.

The ultrasonic vibration application tool provided by the invention comprises the below-described members (a),(b) and (c):

(a) a cylindrical housing having a contact face on a lower or bottom area of an inner surface thereof, and a lower screw area of an outer surface thereof;

(b) a bolted Langevin-type ultrasonic vibrator comprising a front mass, a rear mass and a polarized piezoelectric element arranged between these masses, in which the front mass comprises a cylindrical tool-holder on the lower side and a disc-shaped bulging part on the upper side which is provided with a contact face to be fitted to the contact face of the housing; and (c) a ring-shaped counterweight having an upper screw area on an inner peripheral surface which is screwed with the screw area of the housing.

In addition, there is provided an ultrasonic processing device comprising the ultrasonic vibration application tool described above and a processing tool held by the tool-holder.

Preferred embodiments of the ultrasonic vibration application tool of the invention are described below.

(1) The ultrasonic vibration application tool in which the distance from the edge of the inner peripheral surface of the screw area of the counterweight to the edge of the outer peripheral surface of the counterweight is in the range of 2/3 to 3/1, preferably in the range of 1/1 to 2/1, of the thickness of the counterweight.

(2) The ultrasonic vibration application tool in which the ring-shaped counterweight has a lower small inner diameter part having an inner diameter less than the inner diameter of screw area thereof below the screw area wherein there is a space between the top surface of the lower small inner diameter part and the bottom surface of the cylindrical housing.

(3) The ultrasonic vibration application tool in which the ring-shaped counterweight has a lower small inner diameter part having an inner diameter less than the inner diameter of screw area thereof below the screw area wherein there is a space between the inner peripheral surface of the lower small inner diameter part and the outer peripheral surface of the cylindrical tool-holder.

(4) The ultrasonic vibration application tool in which the contact face of the housing is a tapered face extending toward the bottom surface, and in which the contact face of the disc-shaped bulging part also is a tapered face.

(5) The ultrasonic vibration application tool in which the housing has a ring-shaped concave at the bottom of an inner peripheral surface thereof, wherein the ring-shaped concave has a diameter larger than the diameter of the inner peripheral surface of the housing and in which the contact face of the housing is at least one face selected from the top face and side face of the concave and the contact face of the bulging part of the front mass is a top face or a side face thereof.

(6) The ultrasonic vibration application tool in which the outer peripheral edge of the ring-shaped counterweight vibrates in the direction opposite to the ultrasonic vibration of the Langevin-type ultrasonic vibrator.

Effects of the Invention

In case that the ultrasonic vibration application tool of the invention is installed in an ultrasonic processing device, the loss of ultrasonic vibration energy generated in the ultrasonic vibrator toward the ultrasonic vibration application tool-supporting fixture is prominently reduced. Accordingly, the ultrasonic vibration generated in the Langevin-type ultrasonic vibrator can be applied to the tool attached to the ultrasonic vibration application tool, with high efficiency and high stability.

EMBODIMENTS OF THE INVENTION

Referring to FIGS. 3 to 11, the ultrasonic vibration application tool of the invention and an ultrasonic processing device of the invention are described below in detail.

Figure 1:
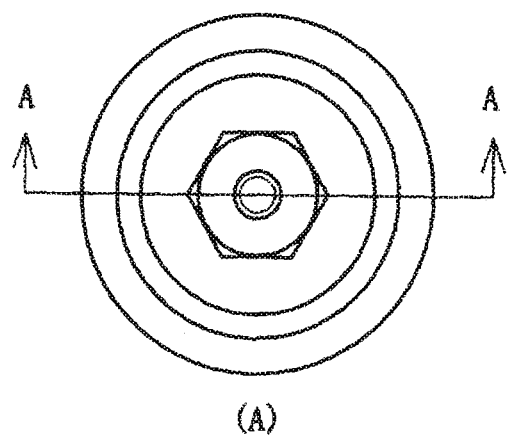
FIG. 1 shows a structure of a representative bolted Langevin-type ultrasonic vibrator (or bolted Langevin-type ultrasonic oscillator).
Figure 1:
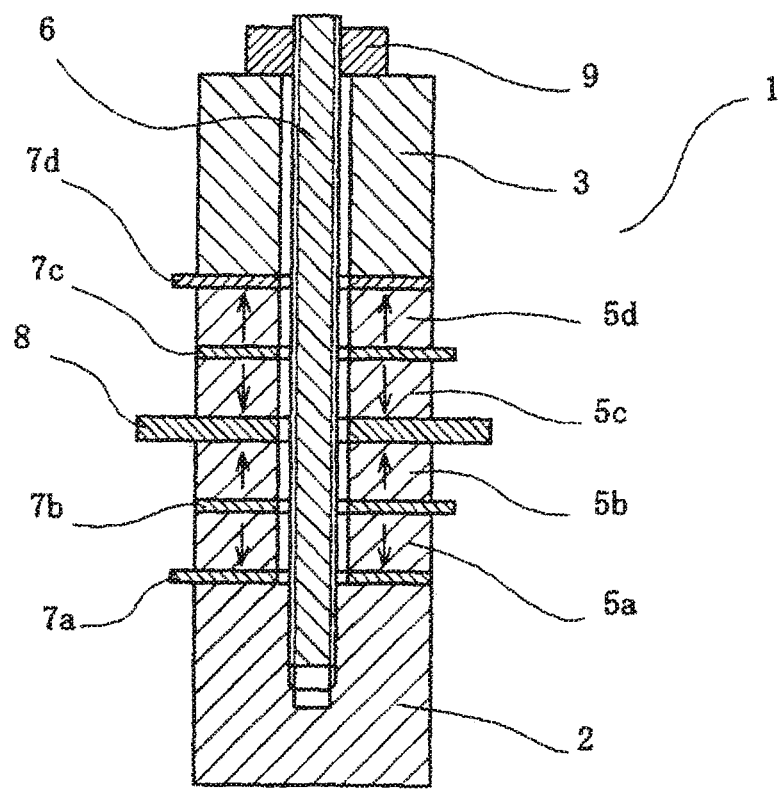
Figure 2:
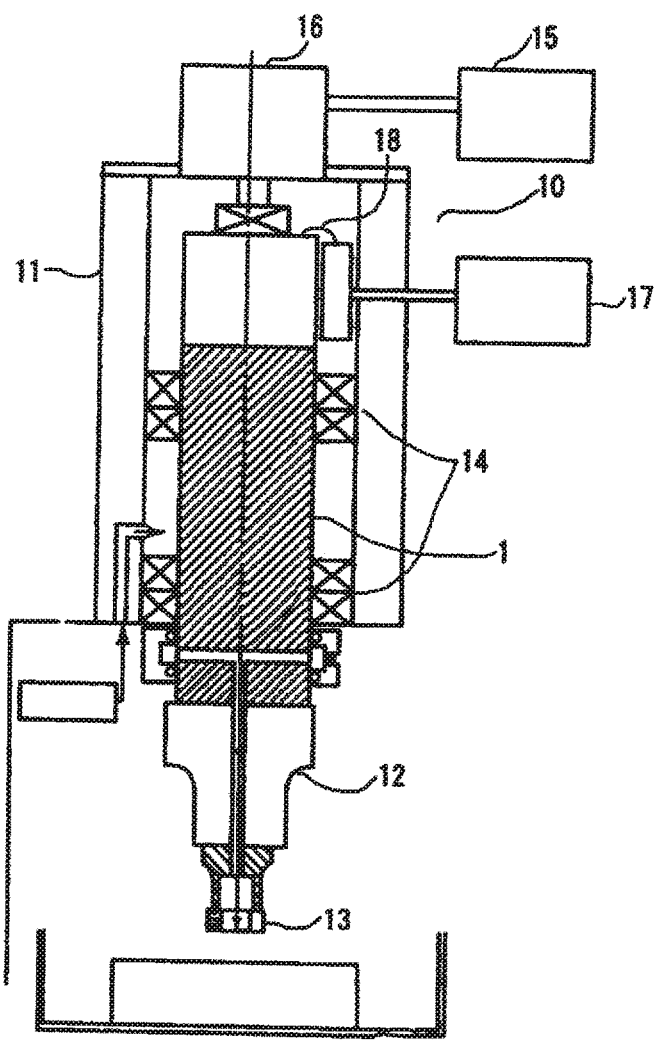
FIG. 2 shows a structure of an ultrasonic processing device utilizing a bolted Langevin-type ultrasonic vibrator.
Figure 3:
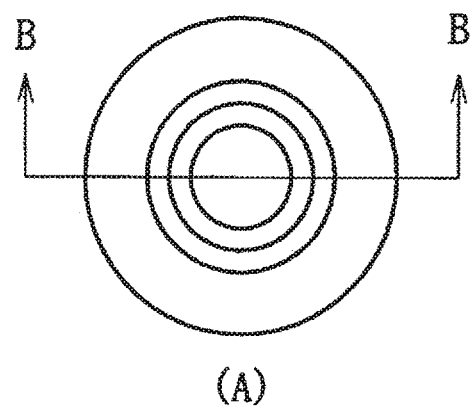
FIG. 3 shows a representative structure of the ultrasonic vibration application tool according to the invention.
Figure 3:
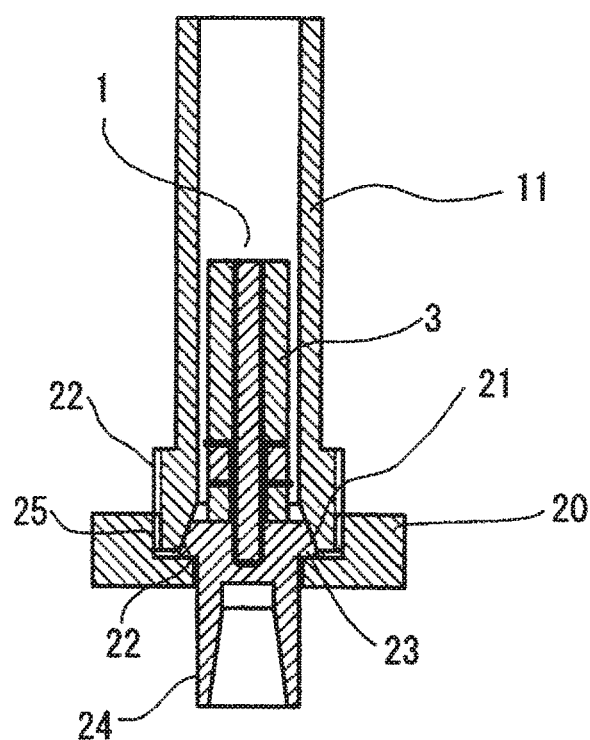

FIG. 3 is a view of a representative structure of the ultrasonic vibration application tool according to the invention. In FIG. 3, (A) shows a top view and (B) shows a sectional view sectioned along the B-B line of (A).

In the FIG. 3-(B), the ultrasonic vibration application tool comprises (a) a cylindrical housing 11, (b) a Langevin-type ultrasonic vibrator 1, and (c) a ring-shaped counterweight 20, which are described below, as main constitutional members. The ultrasonic vibration application tool comprises these constitutional members.

(a) A cylindrical housing having a contact face on a lower or bottom area of an inner surface thereof, and a lower screw area of an outer surface thereof;

(b) A bolted Langevin-type ultrasonic vibrator comprising a front mass, a rear mass and a polarized piezoelectric element arranged between these masses, in which the front mass comprises a cylindrical tool-holder on its lower side and a disc-shaped bulging part on its upper side, which is provided with a contact face to be fitted to the contact face of the housing; and (c) A ring-shaped counterweight having an upper screw area on an inner peripheral surface which is to be screwed with the screw area of the housing.

The cylindrical housing 11 shown in FIG. 3 has a contact face 21 to be fitted to the contact face of the disc-shaped bulging part above the cylindrical tool-holder on a lower or bottom area of an inner surface thereof, and a lower screw area 22 of an outer surface thereof. In the cylindrical housing 11 of FIG. 3, the contact face 11 is a tapered face extending toward the bottom surface. The screw area 22 of the cylindrical housing 11 is a male screw area and is screwed with a screw are (female screw area) of the ring-shaped counterweight described hereinafter.

The Langevin-type ultrasonic vibrator 1 shown in FIG. 3 is a bolted Langevin-type ultrasonic vibrator (or oscillator) comprising a front mass having an cylindrical tool-holder 24 on its lower side and an disc-shaped bulging part 23 on its upper side which is provided with a contact area to be fitted to the contact face 20 of the cylindrical housing 11, a rear mass 3 arranged above the front mass, and a polarized piezoelectric element fixed between these masses by means of a bolt, as is in the usual manner. Thus, the Langevin-type ultrasonic vibrator installed in the ultrasonic vibration application tool of the invention comprises a conventionally used front mass which is equipped with a cylindrical tool-holder. Otherwise, the cylindrical tool-holder is connected to bottom of an individually prepared front mass. The cylindrical tool-holder may be a tool-holder having a polygonal section similar to a circular section.

A variety of tool-holders to be attached to an ultrasonic processing device are already known. These tool-holders can be employed in combination with the ultrasonic vibration application tool of the invention, unless the tool-holder disturbs the function of the ultrasonic vibration application tool of the invention.

The ring-shaped counterweight 20 shown in FIG. 3 has an upper screw area (female screw area) 25 on an inner peripheral surface within which the screw area 22 of the cylindrical housing 11 is screwed.

The outer peripheral edge of the ring-shaped counterweight of the ultrasonic vibration application tool of the invention vibrates in the direction opposite to the direction of ultrasonic vibration generated in the Langevin-type ultrasonic vibrator.

The relationship between the direction of the ultrasonic vibration (or oscillation) generated in the Langevin-type ultrasonic vibrator and the direction of the vibration (or oscillation) of the ring-shaped counterweight is described below in detail, with reference to FIG. 4 and FIG. 5.

Figure 4:
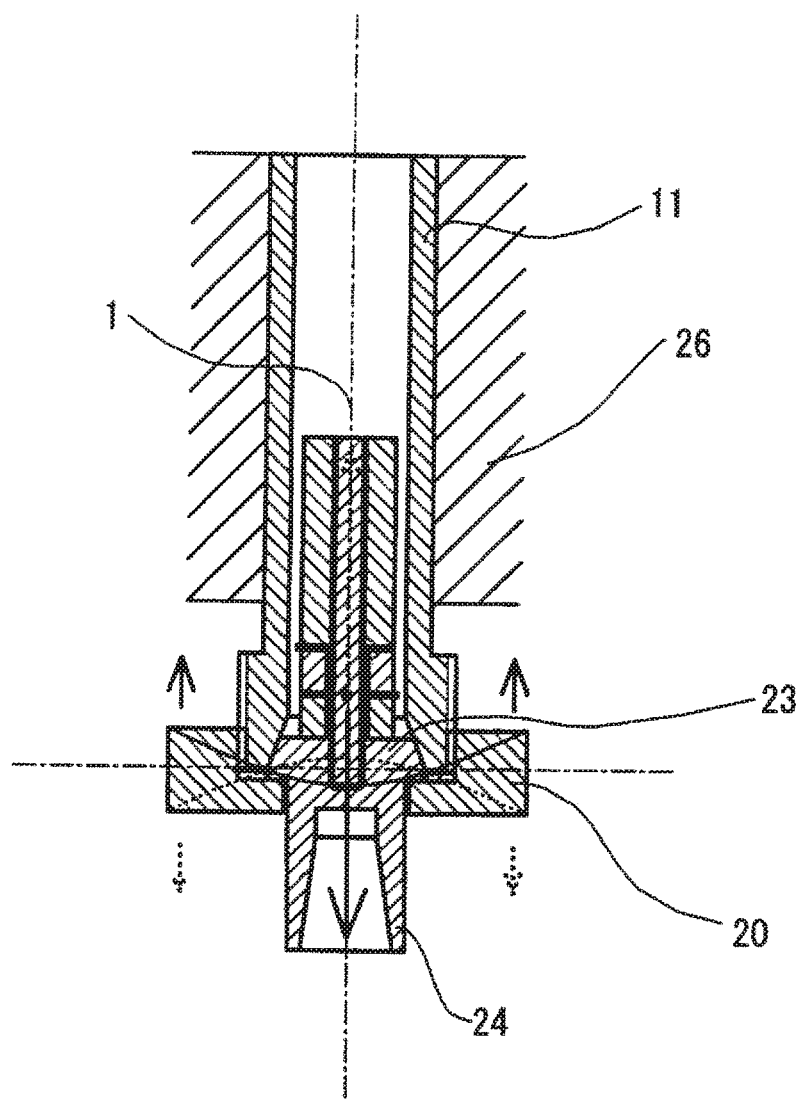
FIG. 4 is an explanatory figure for illustrating an vibration (or oscillation) mode of the ring-shaped counterweight in which the counterweight vibrates in answer to the primary axial vibration (or oscillation) generated in the ultrasonic vibration application tool of the invention which is shown in FIG. 3.

FIG. 4 illustrates the ultrasonic vibration of the Langevin-type ultrasonic vibrator 1 and the vibration of the ring-shaped counterweight 20 caused by the ultrasonic vibration of the vibrator 1, in which both vibrations are observed when the ultrasonic vibration application tool of FIG. 3 is supported (held) by a supporting fixture 26 via the cylindrical housing 11 and then electric energy is applied to the ultrasonic vibrator 1 to generate an ultrasonic vibration of the primary axle vibration mode therein. The ultrasonic vibration of primary axle vibration mode of the ultrasonic vibrator 1 is a vibration comprising reciprocal up-and-down movement from the node (indicated by black point) existing nearly at a center position of the ultrasonic vibrator 1. This movement is shown by the arrows of solid line and dotted line.

The reciprocal up-and-down movement (i.e., extension and shrinkage in the vertical direction) of the Langevin-type ultrasonic vibration 1 causes the vibration (reciprocal up-and-down movement) of the peripheral edge of the ring-shaped counterweight 20 from the node at the point (indicated by a pair of black points) at which the tapered contact face of the disc-shaped bulging part 23 of the cylindrical tool holder 24 of the ultrasonic vibrator 1 is brought into contact with the tapered contact face of the cylindrical housing 11. The reciprocal movement of the peripheral edge of the ring-shaped counterweight 20 is also illustrated by the arrows of solid line and dotted line. It should be noted that the reciprocal up-and-down movement of the peripheral edge of the ring-shaped counterweight 20 is opposite to the movement of the reciprocal movement (i.e., extension and shrinkage in the vertical direction) of the ultrasonic vibration 1.

Because of the reciprocal up-and-down movement of the peripheral edge of the ring-shaped counterweight 20, the transmission of the ultrasonic vibration generated in the Langevin-type ultrasonic vibrator 1 to the cylindrical housing 11 is reduced. Accordingly, the loss of the generated ultrasonic vibration to the supporting fixture via the cylindrical housing is prominently reduced, and consequently the ultrasonic vibration generated in the ultrasonic vibrator 1 is applied to the tool held by the cylindrical tool holder 24 with increased efficiency.

Thus, the ultrasonic vibration is applied to the processing tool with increased efficiency. For this reason, the precision and stability of the ultrasonic processing is enhanced, and the electric energy required for the ultrasonic processing decreases.

In addition, since the area of contact face of the disc-shaped bulging part 23 of the cylindrical tool holder 24 of the ultrasonic vibrator 1 as well as the area of contact face of the cylindrical housing 11 can be enlarged, in comparison with the section area of the flange utilized in the prior art ultrasonic vibrator, the Langevin-type vibrator can be more stably supported in the ultrasonic processing device. Therefore, the Langevin-type ultrasonic vibrator and the processing tool held by the vibrator can be stably supported even when the processing procedure is performed for a long term.

Figure 5:
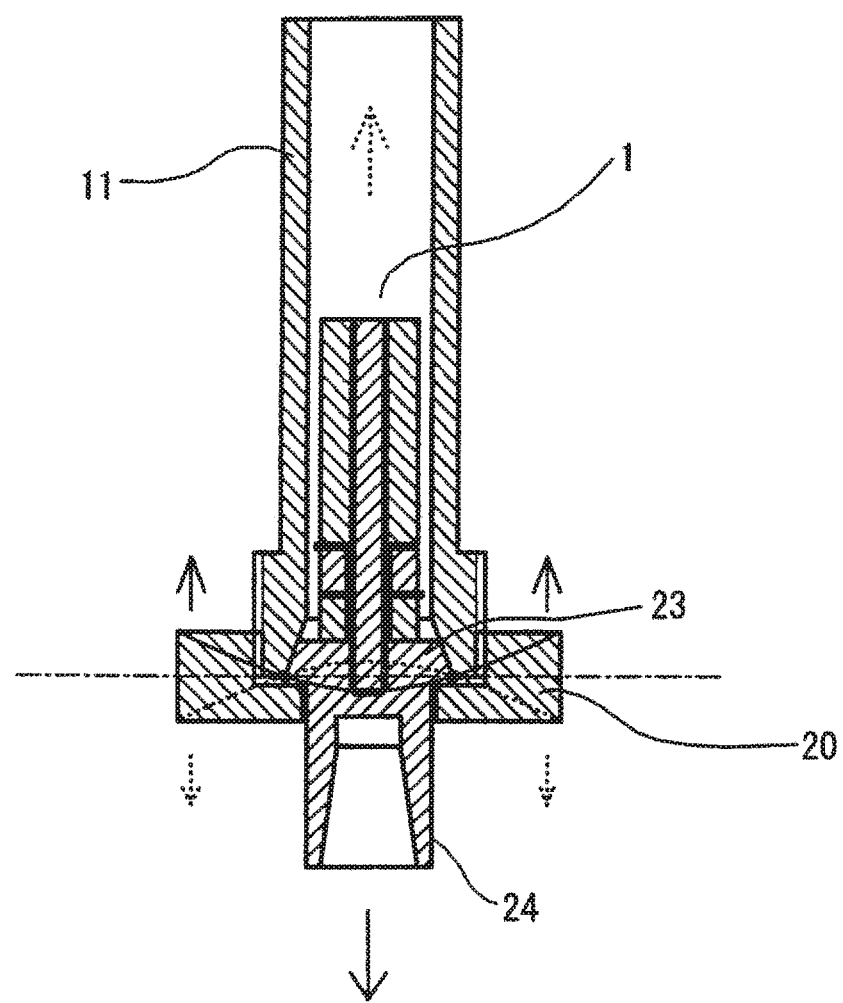
FIG. 5 is an explanatory figure for illustrating an vibration (or oscillation) mode of the ring-shaped counterweight in which the counterweight vibrates in answer to the pseudo zero order vibration (or oscillation) generated in the ultrasonic vibration application tool of the invention which is shown in FIG. 3.
Figure 6:
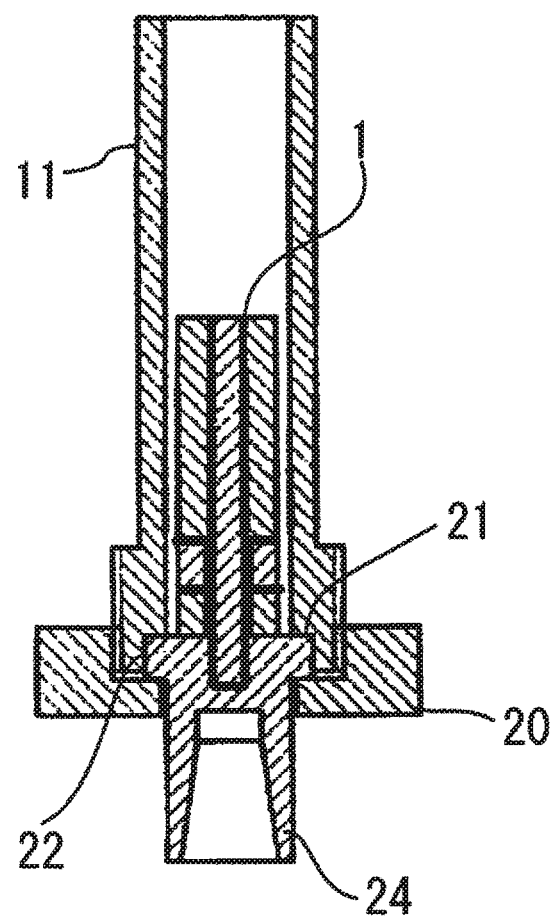
FIG. 6 shows a structure of an ultrasonic vibration application tool of the invention which differs from that shown in FIG. 3.
Figure 7:
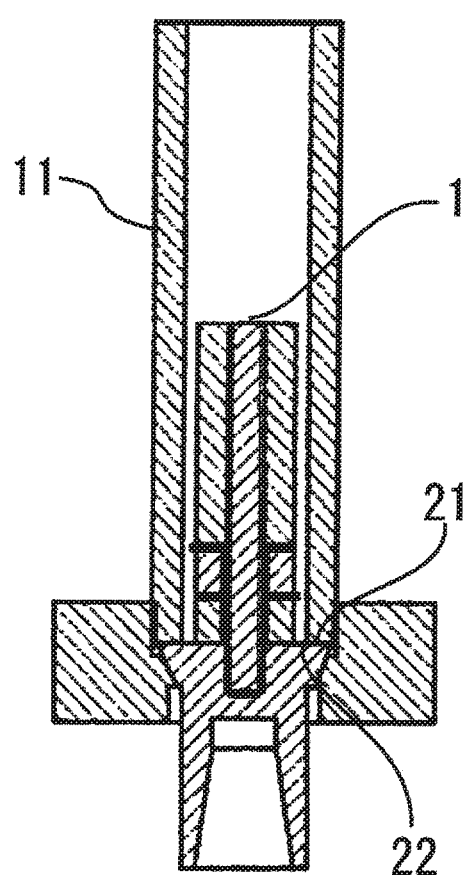
FIG. 7 shows a structure of an ultrasonic vibration application tool of the invention which differs from that shown in FIG. 3 and FIG. 6.

FIG. 5 illustrates the ultrasonic vibration of the Langevin-type ultrasonic vibrator 1 and the vibration of the ring-shaped counterweight 20 caused by the ultrasonic vibration of the vibrator 1, in which both vibrations are observed when the ultrasonic vibration application tool of FIG. 3 is supported (held) by a supporting fixture 26 via the cylindrical housing 11 and then electric energy is applied to the ultrasonic vibrator 1 to generate an ultrasonic vibration of the pseudo zero-order axle vibration mode therein. The pseudo zero-order axle vibration mode of Langevin-type ultrasonic vibrator is described in WO 2017/065263A1 in which the preceding invention made by the present inventor is disclosed. Therefore, the description seen in this WO publication is included in the specification of the present application.

In FIG. 5, if the vibration of pseudo zero-order axle vibration mode is generated in the Langevin-type ultrasonic vibrator by the application of electric energy, the vibration containing no node (that is the extension-shrinkage movement) within the Langevin-type ultrasonic vibrator 1 occurs, and the Langevin-type ultrasonic vibrator per se vibrates reciprocating up-and-down. This reciprocating vibration is shown by the solid line and dotted line. The reciprocal up-and-down movement of the ring-shaped counterweight 20 is opposite to the movement of the reciprocal movement of the ultrasonic vibration 1.

Therefore, even in the case that the Langevin-type ultrasonic vibrator vibrates in the pseudo zero order vibration mode, the ultrasonic vibration generated in the Langevin-type ultrasonic vibrator 1 is hardly transmitted to the cylindrical housing, as a result of the vibration (i.e., reciprocating up-and-down movement) of the outer peripheral dege of the ring-shaped counterweight 20. Accordingly, the ultrasonic vibration generated in the ultrasonic vibrator 1 is applied to the processing tool held by the cylindrical tool holder 24 with increased efficiency.

Thus, the ultrasonic vibration is applied to the processing tool with increased efficiency. For this reason, the precision and reliability of the ultrasonic processing are enhanced, and the electric energy required for performing the ultrasonic processing decreases.

In addition, since the area of contact face of the disc-shaped bulging part 23 of the cylindrical tool holder 24 of the ultrasonic vibrator 1 as well as the area of contact face of the cylindrical housing 11 can be made large, in comparison with the section area of the flange utilized in the prior art ultrasonic vibrator, the Langevin-type vibrator can be more stably supported in the ultrasonic processing device. Therefore, the Langevin-type ultrasonic vibrator and the processing tool held by the vibrator can be well supported even in the long term processing procedure.

Figure 8:
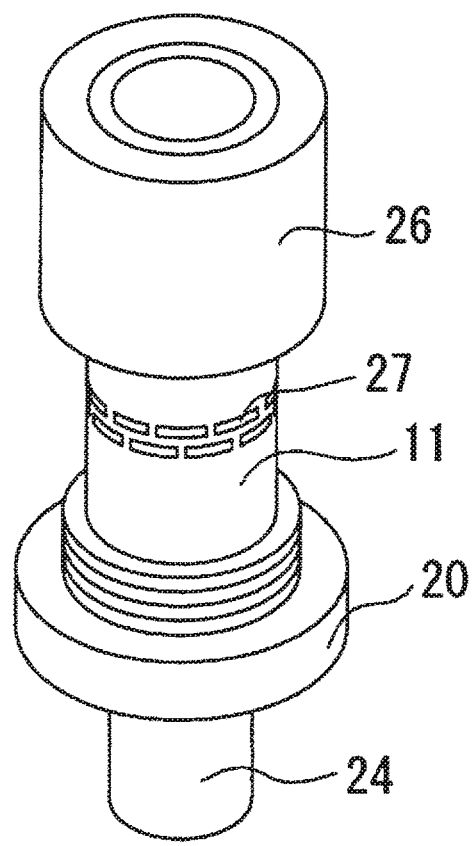
FIG. 8 is a perspective view of an ultrasonic vibration application tool of the invention in which the cylindrical housing has a slit on its side wall.

FIG. 8 is a perspective view illustrating other constitution of the ultrasonic vibration application tool embodying the present invention, in which a slit 27 is formed on the side wall of the cylindrical housing 11. The ring-shaped counterweight is indicated by 20, while the cylindrical tool holder is indicated by 24. The ultrasonic vibration application tool is supported and fixed by the application tool-supporting equipment 26. The formation of the slit 27 on the side wall of the cylindrical housing is effective for further reducing the loss of the ultrasonic vibration generated in the vibrator to the cylindrical housing. Moreover, the narrow slit formed along the circumferential direction can work to reduce generation of thermal energy caused by the ultrasonic vibrator and to give reflection of the ultrasonic vibration.

Figure 9:
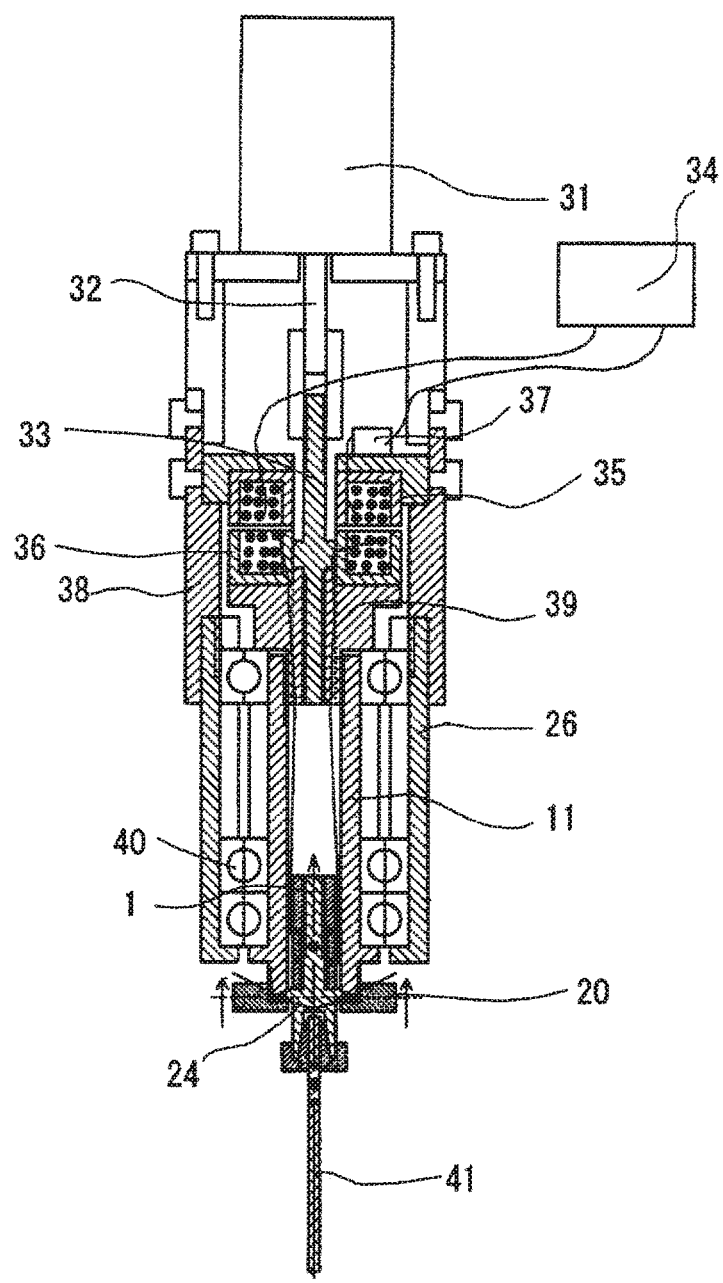
FIG. 9 shows an exemplary structure of an ultrasonic processing device in which an ultrasonic vibration application tool of the invention is installed. The tool is a drill.

The ultrasonic vibration application tool shown in FIG. 9 has a structure in which an ultrasonic vibration application tool-supporting rotary equipment comprising motor 31, motor axle 32, rotary axle 33, electric source 34, rotary axle of rotary transmitter 36, fixed transmitter base 37, sleeve 38, rotary transmitter base 39, and bearing 30, and the ultrasonic vibration application tool of the invention equipped with a processing tool 41. The ultrasonic vibration application tool-supporting rotary equipment is conventionally utilized in the known ultrasonic processing devices.

Figure 10:
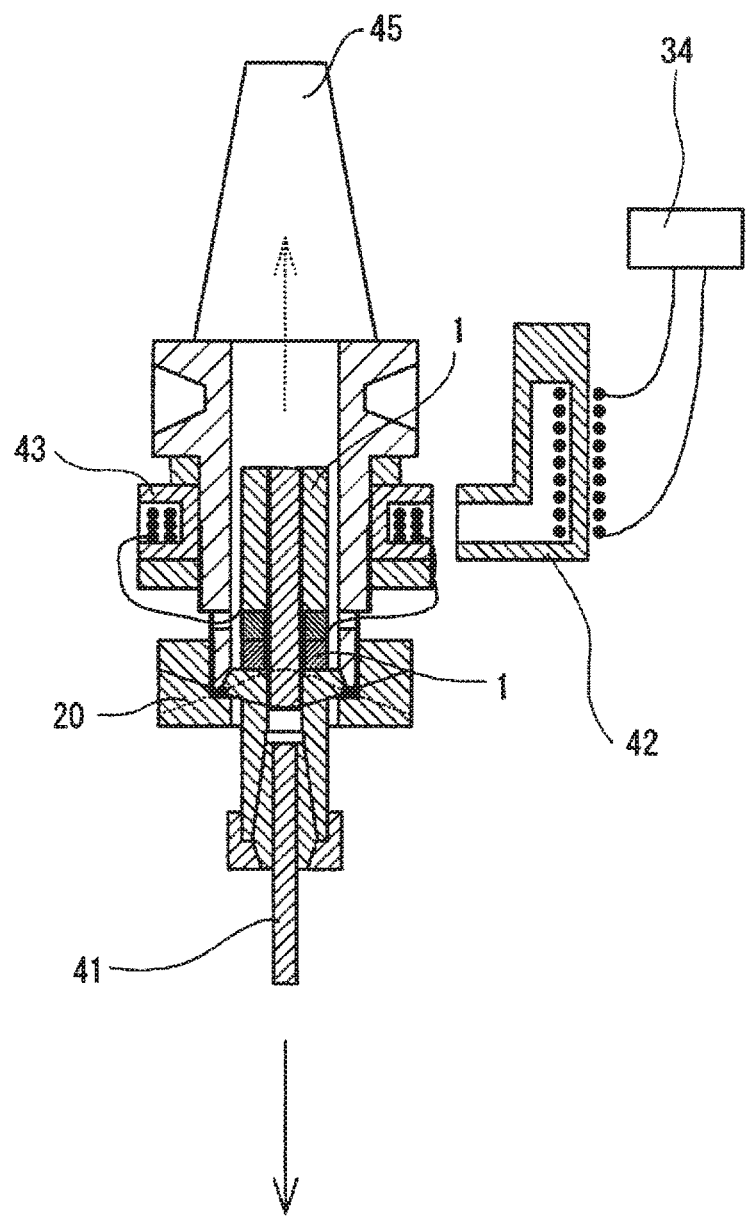
FIG. 10 shows an exemplary structure of an ultrasonic processing device in which an ultrasonic vibration application tool of the invention is installed. The tool is a spindle.

FIG. 10 illustrates an ultrasonic processing device utilizing a spindle (processing tool rotating around the center axle of the ultrasonic vibrator) in which the ultrasonic vibration application tool is placed. An ultrasonic processing device of this structure is an embodiment of the ultrasonic processing device of the invention.

In the use of the ultrasonic processing device of FIG. 10, electric energy supplied from the electric source 34 is applied to the Langevin-type ultrasonic vibrator 1 via a rotary transmitter 42, 43. The ultrasonic processing device of FIG. 10 is designed for incorporating into a machining center at its head 45.

Figure 11:
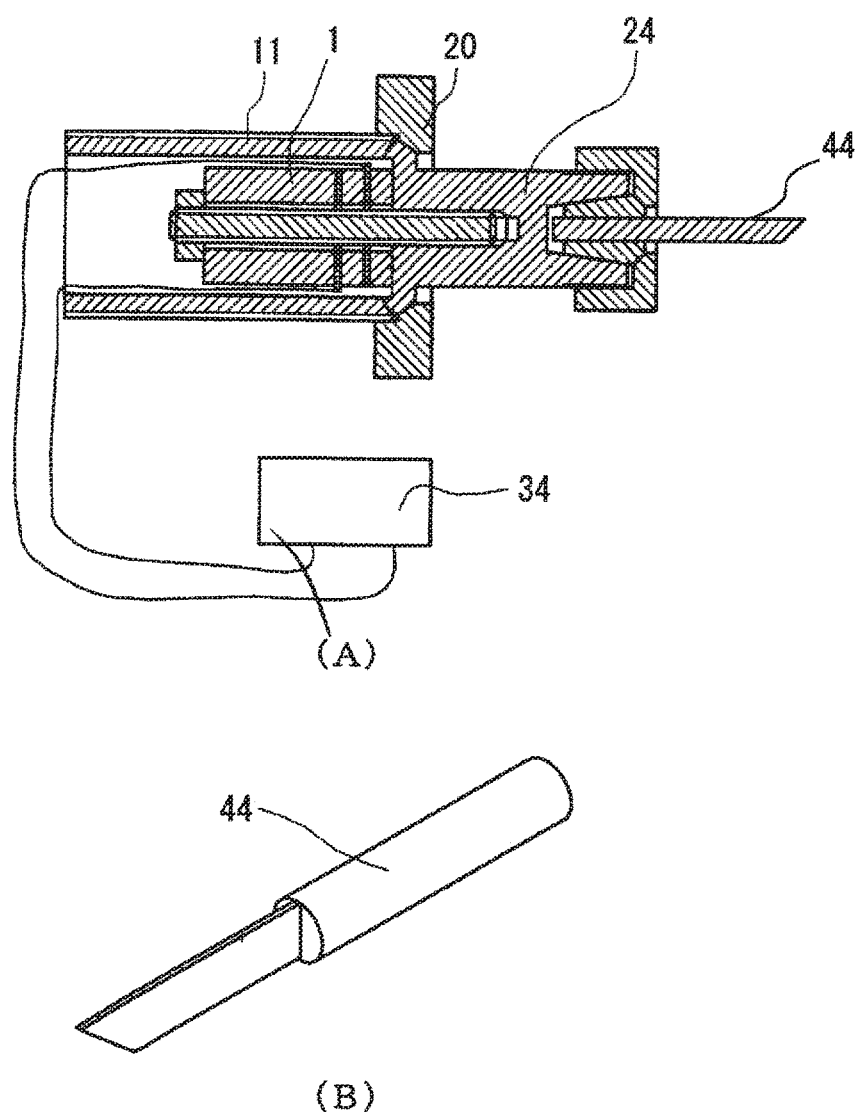
FIG. 11 shows an exemplary structure of an ultrasonic processing device in which an ultrasonic vibration application tool of the invention is installed. The tool is a cutter.

FIG. 11 shows a combination of an ultrasonic vibration application tool of the invention and a cutter 44 (B), which is also utilized in the ultrasonic processing device for performing the ultrasonic processing procedure. In this procedure, the cutter reciprocates along the axle of the ultrasonic vibrator. In the use of the ultrasonic processing device of FIG. 10, either or both of the processing device and the work (i.e., subject to be processed) move lateral direction for varying the relationship of these positions, and the cutter 44 vibrates with the up-and-down motion. Thus, the ultrasonic vibrator-supporting structure does not rotate.

DESCRIPTION OF SYMBOLS

1: bolted Langevin-type ultrasonic vibrator
2: metal block (front mass)
3: metal block (rear mass)
5a, 5b, 5c, 5d: piezoelectric element
6: bolt
7a, 7b, 7c, 7d: electrode
8: flange
9: nut
10: ultrasonic grinding processing device
11: (cylindrical) housing
13: grinding means
20: ring-shaped counterweight
21: contact face
22: screw area
23: disc-shaped bulging part
24: cylindrical tool holder
25: screw area

What is claimed is:

1. An ultrasonic vibration application tool comprising a cylindrical housing having a contact face on a lower or bottom area of an inner surface thereof, and a lower screw area of an outer surface thereof; a bolted Langevin-type ultrasonic vibrator comprising a front mass, a rear mass and a polarized piezoelectric element arranged between these masses, in which the front mass comprises a cylindrical tool-holder on the lower side and a disc-shaped bulging part on the upper side which is provided with a contact face to be fitted to the contact face of the housing; and a ring-shaped counterweight having an upper screw area on an inner peripheral surface which is screwed with the screw area of the housing, in which the ring-shaped counterweight has a lower small inner diameter part having an inner diameter less than the inner diameter of screw area thereof below the screw area wherein there is a space between the inner peripheral surface of the lower small inner diameter part and the outer peripheral surface of the cylindrical tool-holder.

2. The ultrasonic vibration application tool described in claim 1, in which the distance between the edge of the inner peripheral surface of the screw area of the counterweight and the edge of the outer peripheral surface of the counterweight is in the range of 2/3 to 3/1 of the thickness of the counterweight.

3. The ultrasonic vibration application tool described in claim 1, in which the distance between the edge of the inner peripheral surface of the screw area of the counterweight and the edge of the outer peripheral surface of the counterweight is in the range of 1/1 to 2/1 of the thickness of the counterweight.

4. The ultrasonic vibration application tool described in claim 1, in which the ring-shaped counterweight has a lower small inner diameter part having an inner diameter less than the inner diameter of screw area thereof below the screw area wherein there is a space between the top surface of the lower small inner diameter part and the bottom surface of the cylindrical housing.

5. The ultrasonic vibration application tool described in claim 1, in which the contact face of the housing is a tapered face extending toward the bottom surface, and in which the contact face of the disc-shaped bulging part also is a tapered face.

6. The ultrasonic vibration application tool described in claim 1, in which the housing has a ring-shaped concave at the bottom of an inner peripheral surface thereof, wherein the ring-shaped concave has a diameter larger than the diameter of the inner peripheral surface of the housing and in which the contact face of the housing is at least one face selected from the top face and side face of the concave and the contact face of the bulging part of the front mass is a top face or a side face thereof.

7. The ultrasonic vibration application tool described in claim 1, in which the outer peripheral edge of the ring-shaped counterweight vibrates in the direction opposite to the ultrasonic vibration of the Langevin-type ultrasonic vibrator.

8. An ultrasonic processing device comprising the ultrasonic vibration application tool described in claim 1, and a tool held by the tool-holder.

* * * * *